(12) United States Patent
O'Malley

(10) Patent No.: US 11,920,087 B1
(45) Date of Patent: Mar. 5, 2024

(54) VERTICAL THERMAL PRESSURE VESSEL

(71) Applicant: Terry O'Malley, Grapevine, TX (US)

(72) Inventor: Terry O'Malley, Grapevine, TX (US)

( * ) Notice: Subject to any disclaimer, the term of this patent is extended or adjusted under 35 U.S.C. 154(b) by 0 days.

(21) Appl. No.: 17/849,449

(22) Filed: Jun. 24, 2022

(51) Int. Cl.
| C10B 19/00 | (2006.01) |
| C10B 47/38 | (2006.01) |
| F23G 5/00 | (2006.01) |
| F23G 5/10 | (2006.01) |
| H05B 6/10 | (2006.01) |

(52) U.S. Cl.
CPC ............. *C10B 19/00* (2013.01); *C10B 47/38* (2013.01); *F23G 5/002* (2013.01); *F23G 5/10* (2013.01); *H05B 6/105* (2013.01); *F23G 2203/107* (2013.01); *F23G 2209/281* (2013.01)

(58) Field of Classification Search
CPC ......... C10B 19/00; C10B 47/38; F23G 5/002; F23G 5/10
See application file for complete search history.

(56) References Cited

U.S. PATENT DOCUMENTS

| 5,387,321 | A | 2/1995 | Holland |
| 5,449,438 | A | 9/1995 | Jagau et al. |
| 6,051,110 | A | 4/2000 | Dell'Orfano |
| 7,056,422 | B2 | 6/2006 | Dell'Orfano |
| 7,371,308 | B1 * | 5/2008 | Hackl ..................... C10B 53/07 |
| | | | 202/95 |
| 9,334,446 | B2 | 5/2016 | Cheng et al. |
| 9,399,737 | B2 | 7/2016 | Cheng et al. |
| 10,273,411 | B2 | 4/2019 | Shu et al. |
| 10,336,628 | B2 | 7/2019 | Shi et al. |
| 2003/0196884 | A1 | 10/2003 | Dell'Orfano |
| 2009/0050174 | A1 * | 2/2009 | Gheparde ............. B08B 7/0071 |
| | | | 134/1 |
| 2010/0005710 | A1 | 1/2010 | Shaffer |
| 2011/0171114 | A1 * | 7/2011 | Shaw ........................ C08J 11/12 |
| | | | 423/566.1 |
| 2012/0227645 | A1 | 9/2012 | Clarke et al. |
| 2013/0292240 | A1 | 11/2013 | Xiao |
| 2015/0247091 | A1 | 9/2015 | Harada et al. |
| 2016/0068757 | A1 | 3/2016 | Cui et al. |
| 2017/0002270 | A1 | 1/2017 | Shi et al. |
| 2017/0233658 | A1 | 8/2017 | Shu et al. |

FOREIGN PATENT DOCUMENTS

GB 241659 A 10/1925

* cited by examiner

*Primary Examiner* — Jonathan Miller
(74) *Attorney, Agent, or Firm* — Fogarty LLP

(57) ABSTRACT

An apparatus comprises a vessel having an interior chamber formed by a vessel wall. The vessel wall comprises a double-walled structure having an inner wall and an outer wall. A moveable lid is configured to form an airtight seal with the interior chamber in a closed position. A basket is positioned within the chamber. One or more vibration devices, such as transducers, are attached to the basket. A heating coil is positioned within the chamber and surrounding the basket. The heating coil is configured to heat the basket using induction heating. An airtight space is formed between the inner wall and the outer wall and is filled with a gas. The temperature within the chamber may be lowered by cooling the gas.

19 Claims, 3 Drawing Sheets

VERTICAL THERMAL PRESSURE VESSEL

BACKGROUND

Used, reject material and worn-out tires are a problematic source of solid waste. Tires contain components that pose a threat to the environment. Many landfills will not accept used tires, so other sources of disposal must be used. Tires are designed to be practically indestructible, which makes them difficult to recycle.

SUMMARY OF THE INVENTION

Embodiments of the invention provide an apparatus for the automated recycling of used tires. Waste tires are placed in a basket within a sealable vertical thermal pressure vessel (VTPV). The waste tires are heated using induction heating to cause pyrolysis in a vacuum environment. The basket is vibrated during heating so that solid waste material, such as carbon and ash, falls to the floor of the vertical thermal pressure vessel. The solid waste is pushed out of the vertical thermal pressure vessel through a solid waste collection aperture. Other tire waste, such as steel, is captured in the basket. Gas waste products from the decomposing tires are evacuated from the vertical thermal pressure vessel though a gas collection aperture. Once the pyrolysis heating cycle is complete, a cooling cycle takes place assisted by deploying nitrogen in a thermal gap that is used to cool the interior of the vertical thermal pressure vessel.

In one embodiment, an apparatus comprises a vessel having an interior chamber formed by a vessel wall. The vessel wall comprises a double-walled structure having an inner wall and an outer wall, with an interior side on the inner wall. A moveable lid is configured to form an airtight seal with the interior chamber in a closed position. A basket is positioned within the chamber. One or more vibration devices, such as transducers, are attached to the basket.

A heating coil is positioned within the chamber and surrounding the basket. The heating coil is configured to heat the basket using induction heating. A coil cradle attached to the interior side is configured to hold the heating coil in position.

A vessel floor is attached to the interior side and positioned below the basket. A pedestal is positioned to hold the basket above the vessel floor. The vessel floor may be sloped from a center position downward toward the interior wall. One or more paddles may be configured to move across the vessel floor and to push debris on the vessel floor toward a solid waste collection port.

An airtight space is formed between the inner wall and the outer wall and is filled with a gas. The temperature within the chamber is lowered by cooling the gas.

In another embodiment, a method comprise placing material in a mesh basket within a reactor. The reactor has an interior chamber formed by a wall, wherein the wall comprises an inner wall and an outer wall. An airtight space is formed between the inner wall and the outer wall, wherein the airtight space is filled with an inert gas. The method further comprises heating the mesh basket using a heating coil to a target temperature range for decomposition of the material. The heating coil is positioned around the basket and located within the interior chamber. The heating coil is configured to heat the mesh basket using induction heating. The method further comprises shaking the mesh basket using transducers to cause decomposed material to fall to a reactor floor, capturing decomposition gas generated by the material within the interior chamber, and cooling the reactor using the inert gas. The reactor may further comprise a floor that is sloped from a center position downward toward the inner wall, and one or more paddles may be configured to move across the vessel floor and to push debris on the vessel floor toward a solid waste collection port.

BRIEF DESCRIPTION OF THE DRAWINGS

Figure 1:
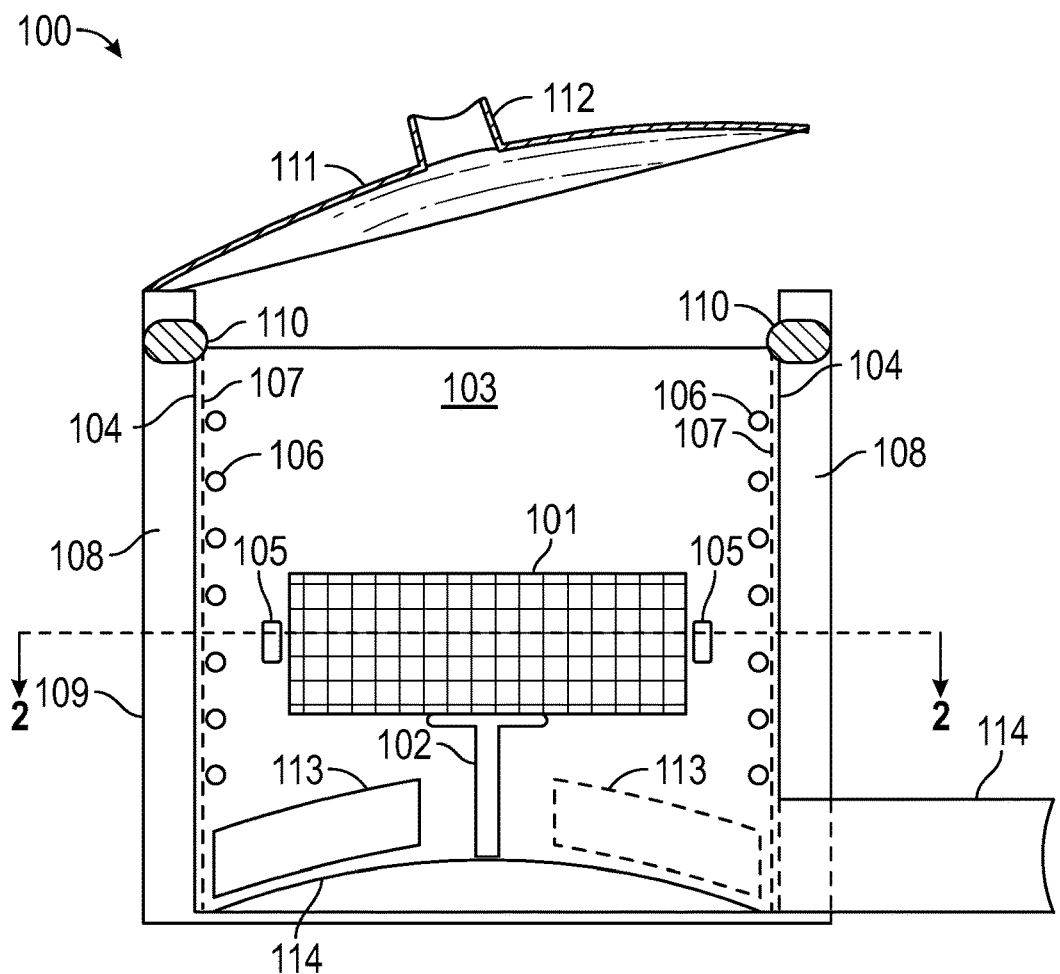

Having thus described the invention in general terms, reference will now be made to the accompanying drawings, wherein:

FIG. 1 is a cross-section view of a vertical thermal pressure vessel according to one embodiment.

Figure 2:
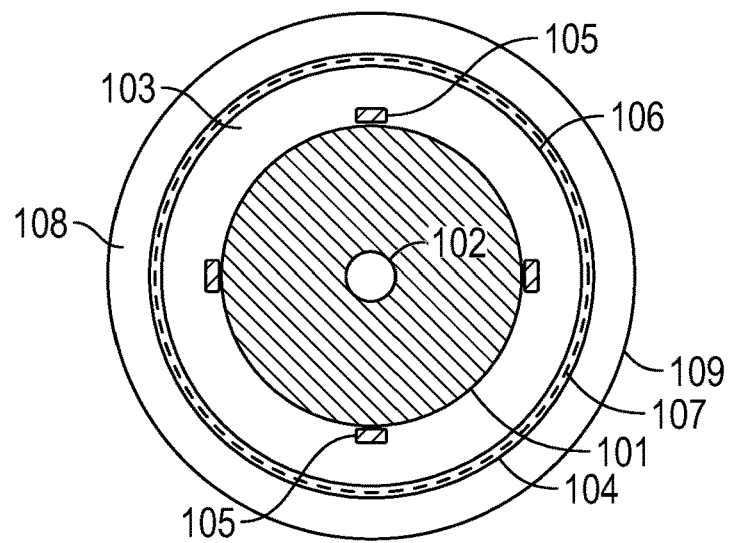

FIG. 2 is a horizontal cross-section view of the vertical thermal pressure vessel according to one embodiment.

Figure 3:
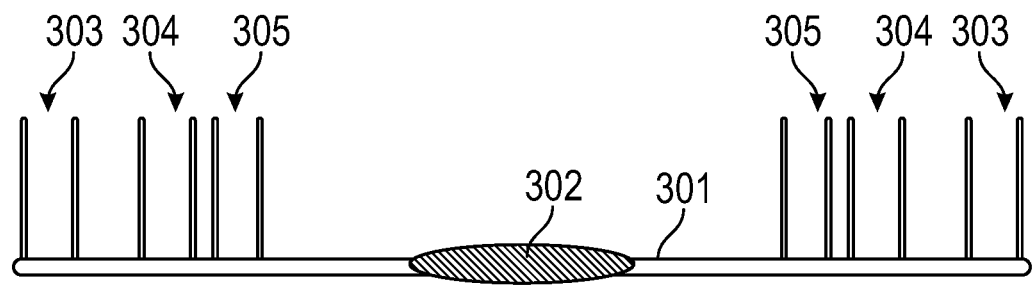

FIG. 3 illustrates a cross-section view of the base of a vertical thermal pressure vessel according to one embodiment.

Figure 4:
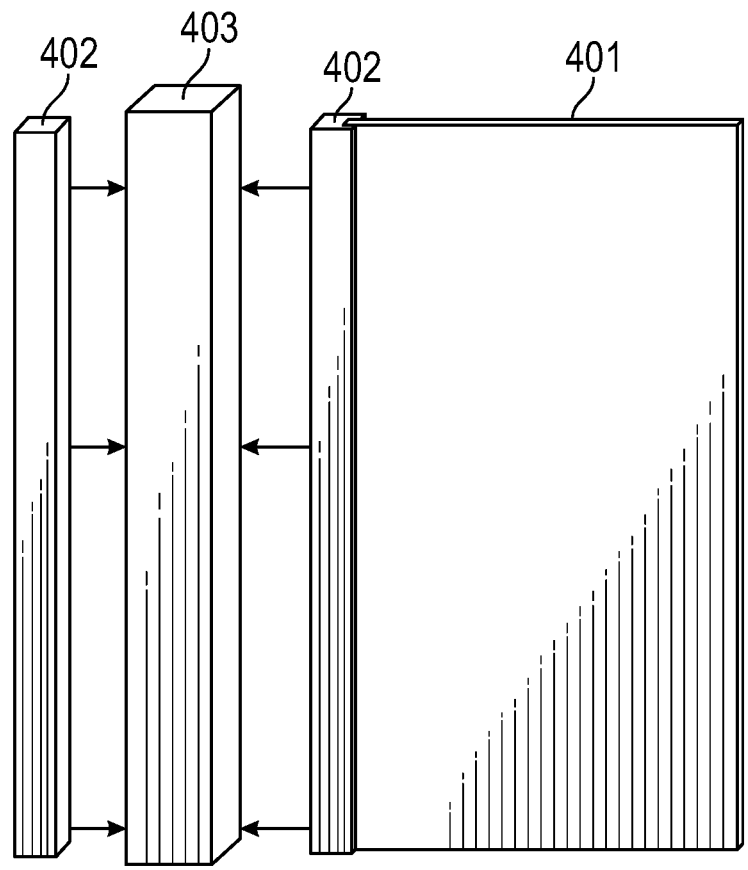

FIG. 4 illustrates a method for creating the exterior tank wall according to an example embodiment.

Figure 5:
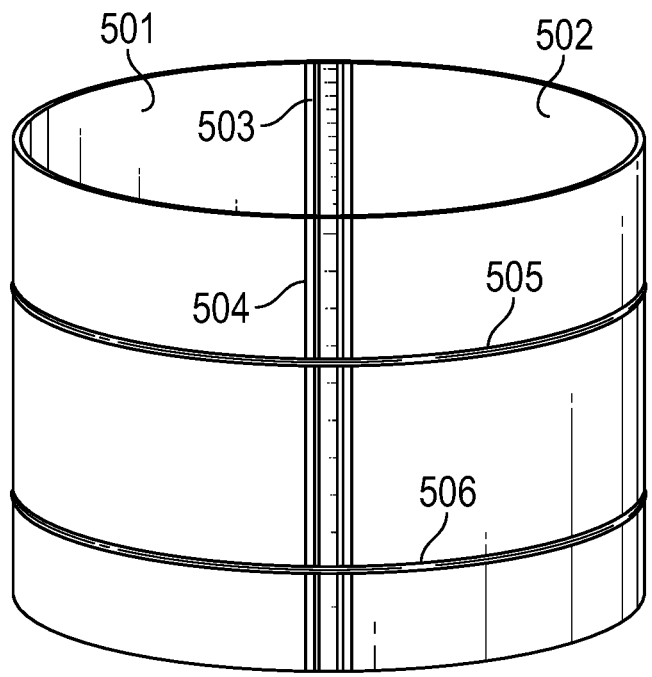

FIG. 5 illustrates an exterior tank wall formed from two semicylinder sections.

Figure 6:
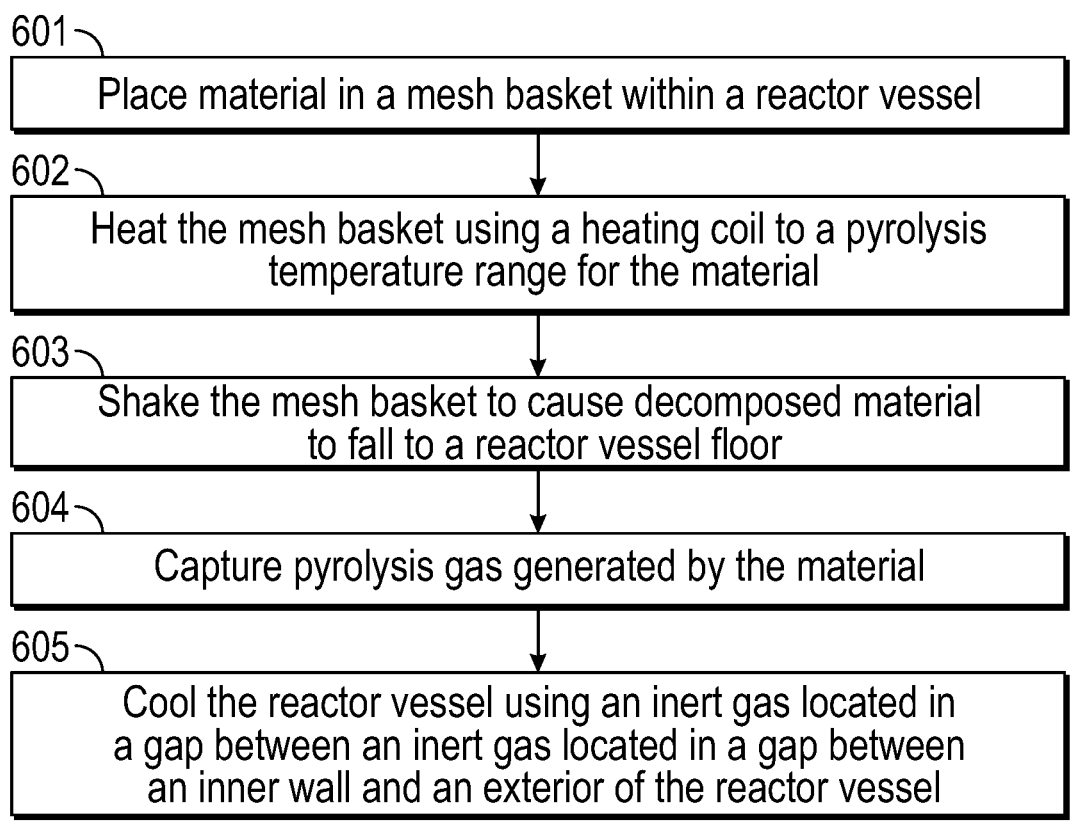

FIG. 6 is a flowchart illustrating a method for pyrolysis according to an example embodiment

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a vertical cross-section view of a vertical thermal pressure vessel 100 according to one embodiment. A basket 101 is supported by a pedestal platform 102 in a hot section 103 of a processing chamber defined by an inner wall 104. Basket 101 may be of any appropriate size that fits within chamber 103. The sides and bottom of basket 101 are mesh. Transducers 105 are positioned on the side wall of basket 101 and, when activated, induce a vibrating movement that causes basket 101 to vibrate or shake. The vibration or agitation of basket 101 shakes or sifts solid waste material, such as carbon black, out of the mesh basket 101 and onto floor 114. The pedestal shaft 102 may be used to lift basket 101 out of processing chamber 103.

Heating coil 106 is held in place by coil cradle frame 107 on or close to inner wall 104. The heating coil 106 is used to heat the chamber 103 and the material in basket 101 using induction heating. Inner wall 104 functions as a support for coil cradle frame 107 to hold heating coil 106. Thermal gap 108 separates inner wall 104 from outer wall 109. Thermal gap 108 is sealed using seal 110, which is positioned between inner wall 104 and outer wall 109. Inert gas, such as nitrogen or argon, may be injected into thermal gap 108 to adjust any thermal overreach in hot section 103 and/or to cool the processing chamber when the material in basket 101 has been completely decomposed.

Outer wall 109 of the vertical thermal pressure vessel 100 encloses the processing chamber 103, inner wall 104, and heating coil 106. In operation, pressure lid 111 is closed on outer shell 109 to seal the vertical thermal pressure vessel 100. Movement of pressure lid 111 may be hydraulically or electrically actuated to facilitate operation.

The inner wall 104 and the outer wall 109 may be constructed from a non-magnetic steel, such as ASTM 321 stainless steel. The basket 101 may be constructed of martensitic stainless steel with a magnetic permeability of 750 H/m, an electrical conductivity of 1.81e6 S/m, a heat capacity of 460 J/kgK, a thermal conductivity of 25 W/mK, a density of 7740 kg/m$^3$, and an emissivity of 0.5. The basket 101 may have a sidewall thickness of 0.5" and a mesh size of 60%.

In one embodiment, vertical thermal pressure vessel 100 is used as a reactor for converting and recycling materials, such as discarded or rejected tire material or waste tires. In operation, whole tires and/or shredded tire material is placed in basket 101. The vertical thermal pressure vessel 100 is then sealed and heated to a high temperature to cause the thermal-chemical decomposition of the tire material. Pedestal platform 102 may be configured to extend to lift basket 101 out of vertical thermal pressure vessel 100 to facilitate loading of the material for processing.

In an example embodiment, the basket 101 may have an outside diameter of 10' and a height of 8', which would provide a capacity of approximately 628 cubic feet (or 23 cubic yards). Assuming the volume of a tire is 1.57 cubic feet, and that the basket is 80-85% filled, this configuration would allow for processing of approximately 320 tires. Further, assuming the average tire weight is 25 pounds, then this configuration would allow for processing of 4 tons of tires. Alternatively, the basket 101 may have a diameter of 9.5' and a height of 10.5', which would provide a capacity of approximately 744 cubic feet (or 27.5 cubic yards). Based on the tire assumptions above, this configuration would allow for processing of approximately 400 tires, which is 5 tons of tires.

The overall width of the vessel 100 may be approximately 12' with a height of 15'. The thermal gap 108 may be approximately 6" wide, and the distance from the inner wall 104 to the heating coil 106 may be approximately 6". Basket 101 is the target for the heating created by the heating coil 106. The heating coil 106 may be positioned approximately 0.5" from the sides of basket 101. The heating coil 106 may comprise loops of a rectangular tubing, wherein the loops have an inside diameter of 122" and are spaced at 3" per turn with 16 turns. In an alternative arrangement, heating coil 106 may comprise two parallel coils having 8 turns each. 1100A of current may be applied to the coil 106 at a frequency of 4 Hz. The target temperature for basket 101 is 650-900° C. The time to reach the target temperature is expected to be approximately 30 minutes but may take an hour if a reduced power setting is used. The total processing time at temperature is anticipated to be 3-4 hours, which would be followed by a half-hour cool down time. Assuming reactor clean-out and restocking in between cycles would take approximately 30 minutes, the entire cycle time would be approximately 6 hours. This would allow for four cycles per 24 hours.

During operation, as the waste tires and/or material is heated, the rubber softens and breaks down into smaller molecules and vapor. The vapor exits the processing chamber 103 and passes through the gas collection port 112, which may be located on pressure lid 111 as illustrated or may pass through side walls 104 and 109. As the tires and/or material decompose, carbon and ash from the tires falls to the floor 114 of the processing chamber 103 and larger waste material (e.g., steel belt and bead wire fragments) is captured in basket 101. Floor or base 114 may have a convex or sloped shape to facilitate movement of the carbon, ash, and any other material and/or metallic waste to the edges of the processing chamber 104. Additionally, one or more collector paddles 113 may rotate within processing chamber 103 to push the carbon ash and steel waste toward solid waste collection port 114 and out of chamber 103.

FIG. 2 is a horizontal cross-section view of the vertical thermal pressure vessel taken long line 2 as shown in FIG. 1. The vertical thermal pressure vessel 100 in FIG. 2 illustrates how the components may be arranged in one embodiment. It will be understood that, in other embodiments, the relationship of the components, such as the thickness of walls 104 and 109 or thermal gap 108, the size of basket 101 and pedestal 102, or the number and position of transducers 105, may vary without deviating from the concepts disclosed herein.

FIG. 3 illustrates a cross-section view of the base of a vertical thermal pressure vessel according to one embodiment. Floor or base 301 is illustrated with a relatively flat profile but may have a convex or sloped shape in other embodiments to facilitate movement of material to the edges of the processing chamber. The pedestal for the basket attaches to pedestal indentation 302. The outer tank wall attaches to base 301 at joint 303. The inner tank wall attaches to base 301 at joint 304. The heating coil and frame are held in position using coil cradle 305.

FIG. 4 illustrates a method for creating the exterior tank wall according to an example embodiment. The exterior tank wall may be a metal sheet 401 that is rolled to form a cylindrical shape. Each end of the metal sheet 401 is attached to a tank wall joint 402. When the sheet is rolled into a cylindrical shape, the tank wall joints 402 are joined using tank seam 403. In other embodiments, the exterior tank wall may comprise two or more metal sheets that are formed into a curved section. The ends of each section may be attached to tank wall joints 402 that are then joined using two or more tank seams 403 to form a cylindrical shape. The inner wall may be formed in the same manner.

FIG. 5 illustrates an exterior tank wall formed from two sections 501 and 502 that are formed into a semicylinder shape. The ends of each section 501 and 502 are joined using tank seams 503 and 504 to form the cylindrical tank wall. The external tank wall is reinforced using tank straps 505 and 506, which prevent tank seams 503 and 504 from rupturing when the exterior tank wall is placed under pressure during operation. The inner wall may be formed in the same manner.

FIG. 6 is a flowchart illustrating a method for pyrolysis according to an example embodiment. In step 601, material is placed in a mesh basket within a reactor vessel. In step 602, the mesh basket is heated using a heating coil to a pyrolysis temperature range for the material. The heating coil is positioned around the basket and located within the reactor vessel. The heating coil heats the mesh basket using induction heating.

In step 603, the mesh basket is shaken or vibrated to cause decomposed material to fall to a reactor vessel floor. One or more transducers are used for shaking the mesh basket. In step 604, pyrolysis gas generated by the material is captured. In step 605, the reactor vessel is cooled using an inert gas that is located in a gap between an inner wall and an exterior wall of the reactor vessel.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed.

Although specific terms are employed herein, they are used in a generic and descriptive sense only and not for purposes of limitation.

What is claimed is:

1. A method for pyrolysis, comprising:
placing material in a mesh basket within a reactor vessel;
heating the mesh basket using a heating coil to a pyrolysis temperature range for the material, wherein the heating coil is positioned around the basket and located within the reactor vessel;
shaking the mesh basket to cause decomposed material to fall through the mesh basket to a reactor vessel floor, wherein one or more transducers are used for shaking the mesh basket; and
capturing pyrolysis gas generated by the material.

2. The method of claim 1, further comprising:
cooling the reactor vessel using an inert gas, wherein the inert gas is injected into a gap between an inner wall and an exterior wall of the reactor vessel.

3. The method of claim 1, wherein the heating coil heats the mesh basket using induction heating.

4. The method of claim 1, wherein the material comprises one or more tires.

5. The method of claim 4, further comprising:
capturing a steel material of the tires in the basket; and
removing the steel material from the basket after the reactor vessel has cooled.

6. The method of claim 1, further comprising:
cooling the gas into a liquid using an inert gas.

7. The method of claim 6, wherein the inert gas comprises at least one of nitrogen or argon.

8. A method, comprising:
placing material in a mesh basket within a reactor, the reactor having an interior chamber formed by a wall, wherein the wall comprises an inner wall and an outer wall and an airtight space between the inner wall and the outer wall, wherein the airtight space is injected with an inert gas;
heating the mesh basket using a heating coil to a target temperature range for decomposition of the material, wherein the heating coil is positioned around the basket and located within the interior chamber;
shaking the mesh basket using transducers to cause decomposed material to fall to a reactor floor through the mesh basket;
capturing decomposition gas generated by the material within the interior chamber; and
cooling the reactor using the inert gas.

9. The method of claim 8, wherein the heating coil is configured to heat the mesh basket using induction heating.

10. The method of claim 8, wherein the reactor further comprises a floor that is sloped from a center position downward toward the inner wall, and one or more paddles configured to move across the vessel floor and to push debris on the vessel floor toward a solid waste collection port.

11. A method for pyrolysis, comprising:
placing material in a mesh basket within a reactor vessel;
applying a vacuum within the reactor vessel;
heating the mesh basket using a heating coil to a pyrolysis temperature range for the material, wherein the heating coil is positioned around the basket and located within the reactor vessel; and
shaking, using one or more transducers, the mesh basket to cause decomposed material to fall to a reactor vessel floor.

12. The method of claim 11, further comprising:
cooling the reactor vessel using an inert gas, wherein the inert gas is injected into a gap between an inner wall and an exterior wall of the reactor vessel.

13. The method of claim 11, wherein the heating coil heats the mesh basket using induction heating.

14. The method of claim 11, wherein the material comprises one or more tires.

15. The method of claim 14, further comprising:
capturing a steel material of the tires in the basket; and
removing the steel material from the basket after the reactor vessel has cooled.

16. The method of claim 11, further comprising pushing, using one or more paddles, debris on the vessel floor toward a solid waste collection port.

17. The method of claim 16, wherein the vessel floor comprises a convex shape.

18. The method of claim 14, further comprising:
capturing pyrolysis gas generated by the material; and
cooling the gas into a liquid using an inert gas.

19. The method of claim 17, wherein the inert gas comprises at least one of nitrogen or argon.

* * * * *